May 13, 1958 V. G. WILLIAMS 2,834,383
POWDER FILLING MACHINE
Filed Dec. 17, 1952 6 Sheets-Sheet 1

Inventor
Victor G. Williams
By J. Stanley Churchill
Attorney

Inventor
Victor G. Williams

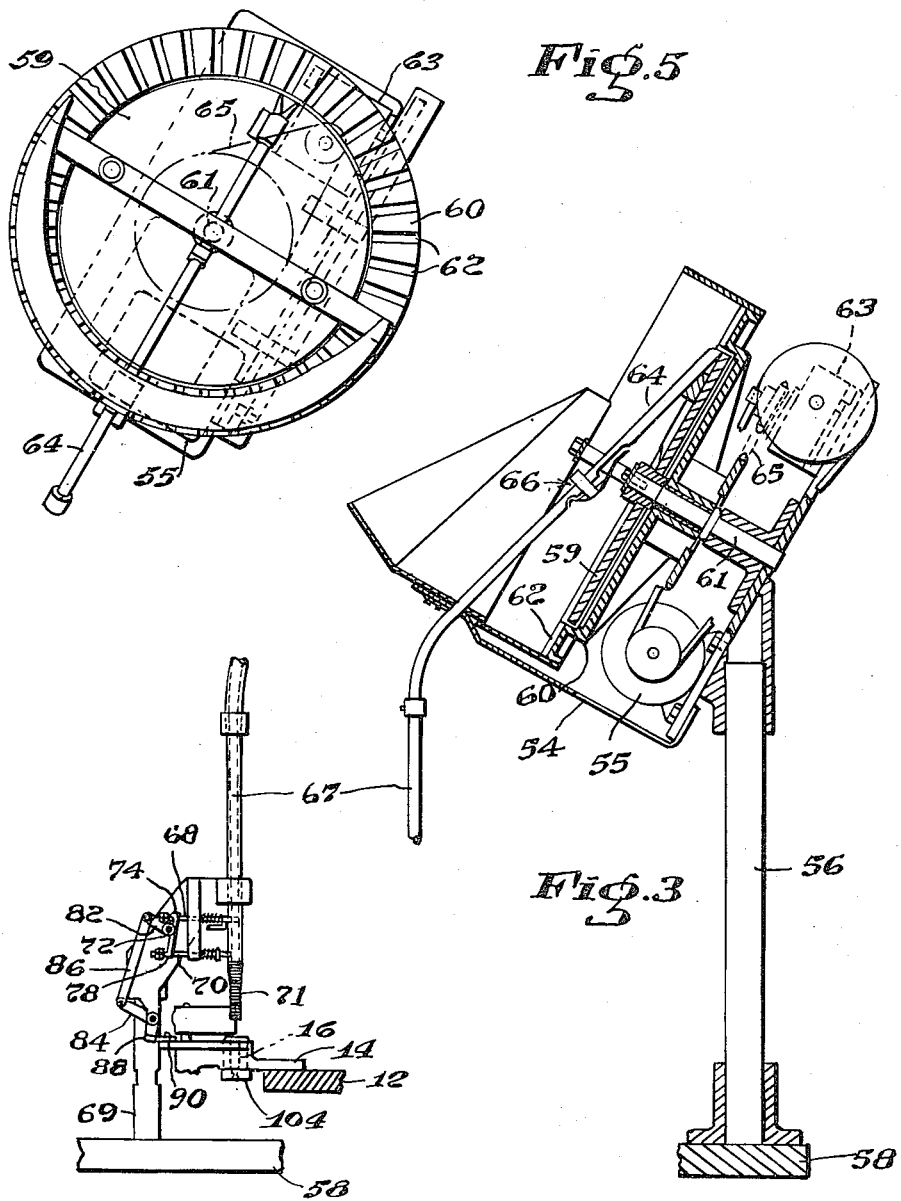

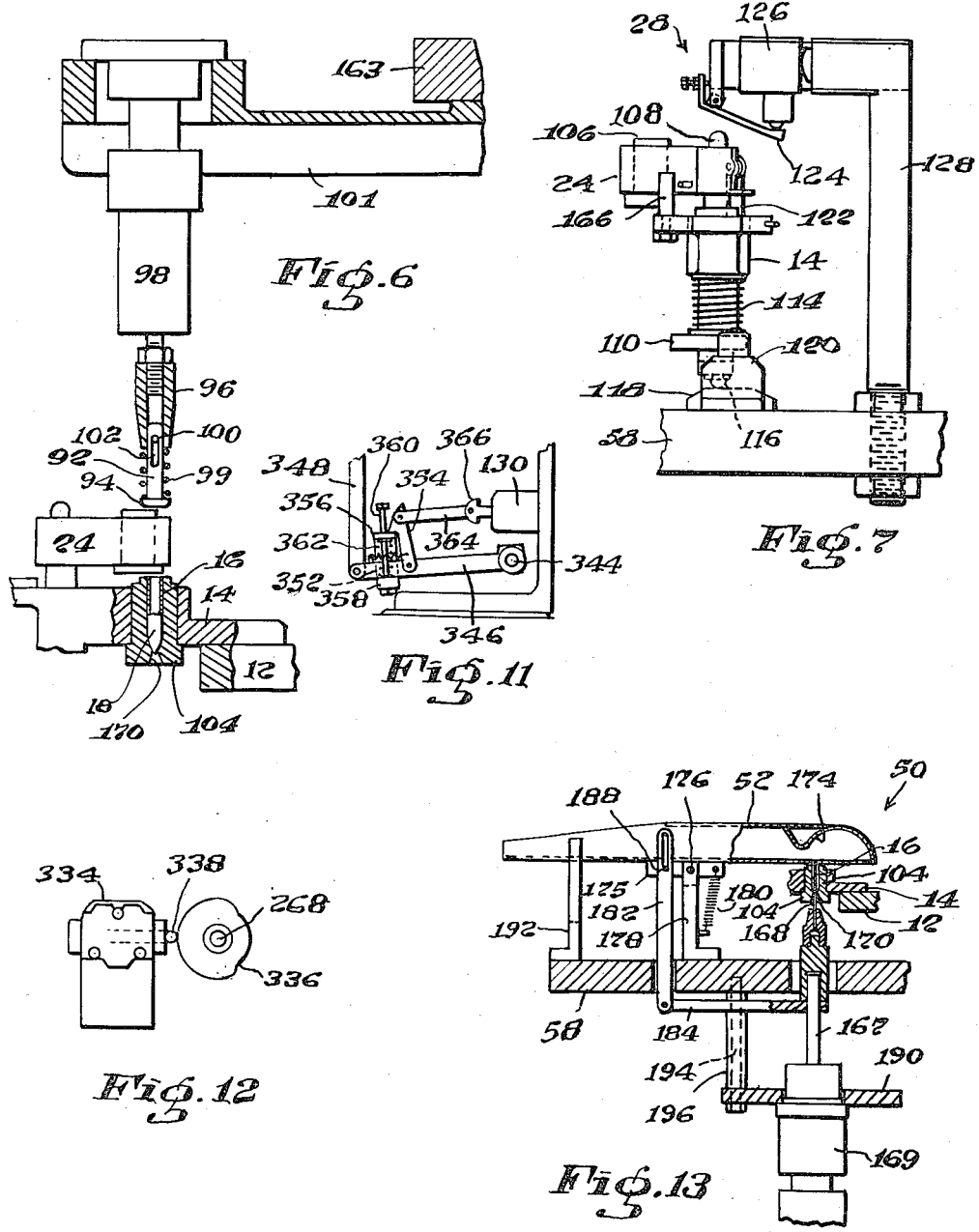

May 13, 1958 V. G. WILLIAMS 2,834,383
POWDER FILLING MACHINE
Filed Dec. 17, 1952 6 Sheets—Sheet 5

Inventor
Victor G. Williams
By J. Stanley Churchill
Attorney

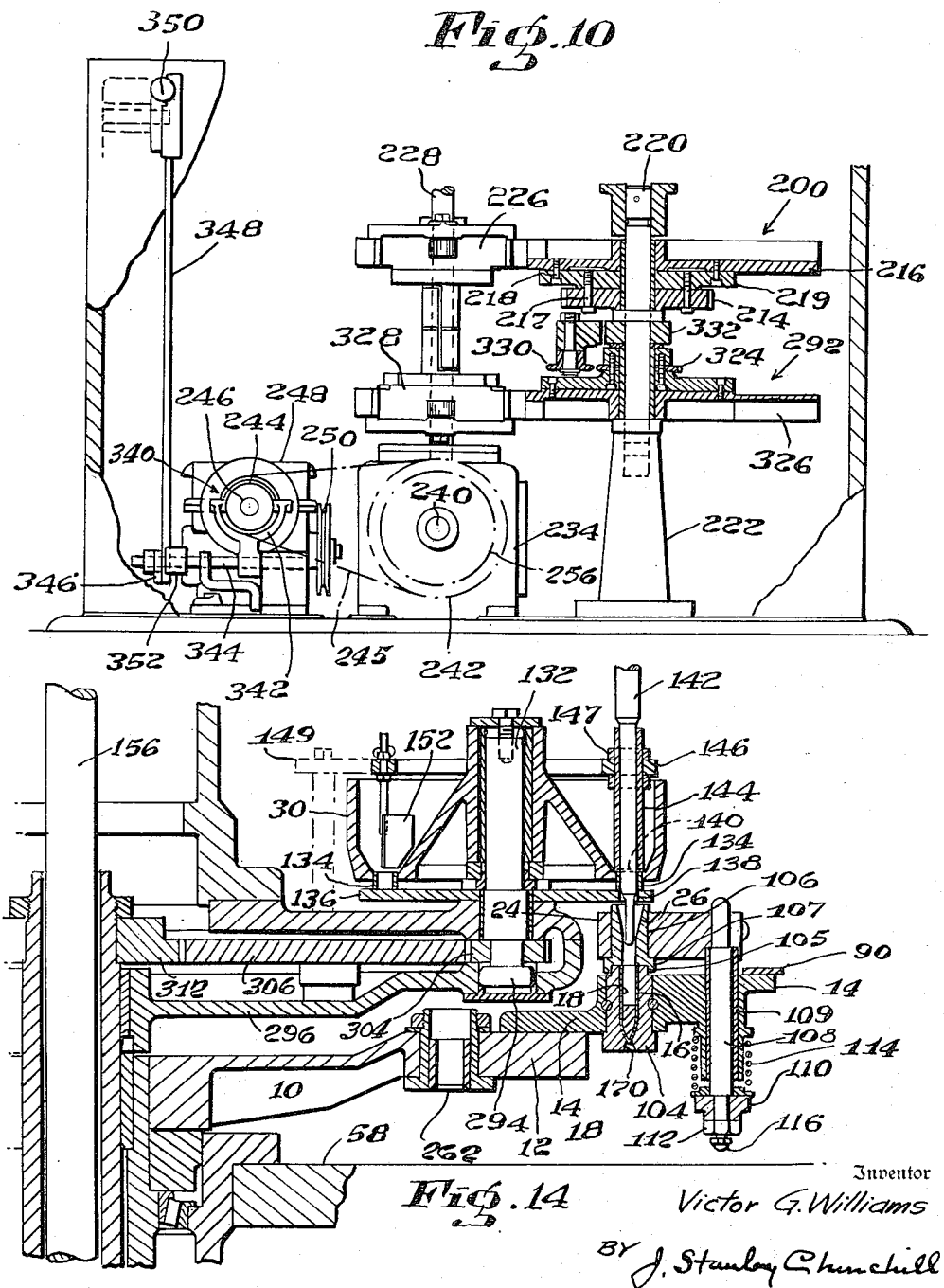

United States Patent Office 2,834,383
Patented May 13, 1958

2,834,383

POWDER FILLING MACHINE

Victor G. Williams, Toronto, Ontario, Canada, assignor to Delamere & Williams Company, Limited, Toronto, Ontario, Canada, a corporation of Ontario Application December 17, 1952, Serial No. 326,449

2 Claims. (Cl. 141—73)

This invention relates to a projectile casing filling machine and more particularly to such a filling machine wherein the powder is compressed in the projectile casing.

The invention has for an object to provide a novel and improved filling machine of the character described for filling successive cartridge casings and for compressing the contents thereof in a novel, rapid and superior manner.

With this general object in view and such others as may hereinafter appear, the invention consists in the filling machine and in the various structures, arrangements and combinations of parts hereinafter described and particularly defined in the claims at the end of this specification.

In the drawings illustrating the preferred embodiment of the invention:

Fig. 3 is a cross-sectional view of the container feeding device;

Fig. 4 is a detail view of the container releasing mechanism;

Fig. 5 is a plan view of the container feeding device;

Fig. 6 is a detail view in cross section taken on the line 6—6 of Fig. 1;

Fig. 7 is a detail view of a safety device as seen from the line 7—7 of Fig. 1;

Fig. 10 is a cross-sectional view of the Geneva driving mechanism;

Fig. 11 is a detail view of clutch releasing mechanism;

Fig. 12 is a detail view of a cam-operated valve;

Fig. 13 is a cross-sectional view of the ejecting mechanism taken on the line 13—13 of Fig. 1;

Fig. 14 is a cross-sectional detail view of the material feeding hopper and associated mechanism.

Figures 1, 15:
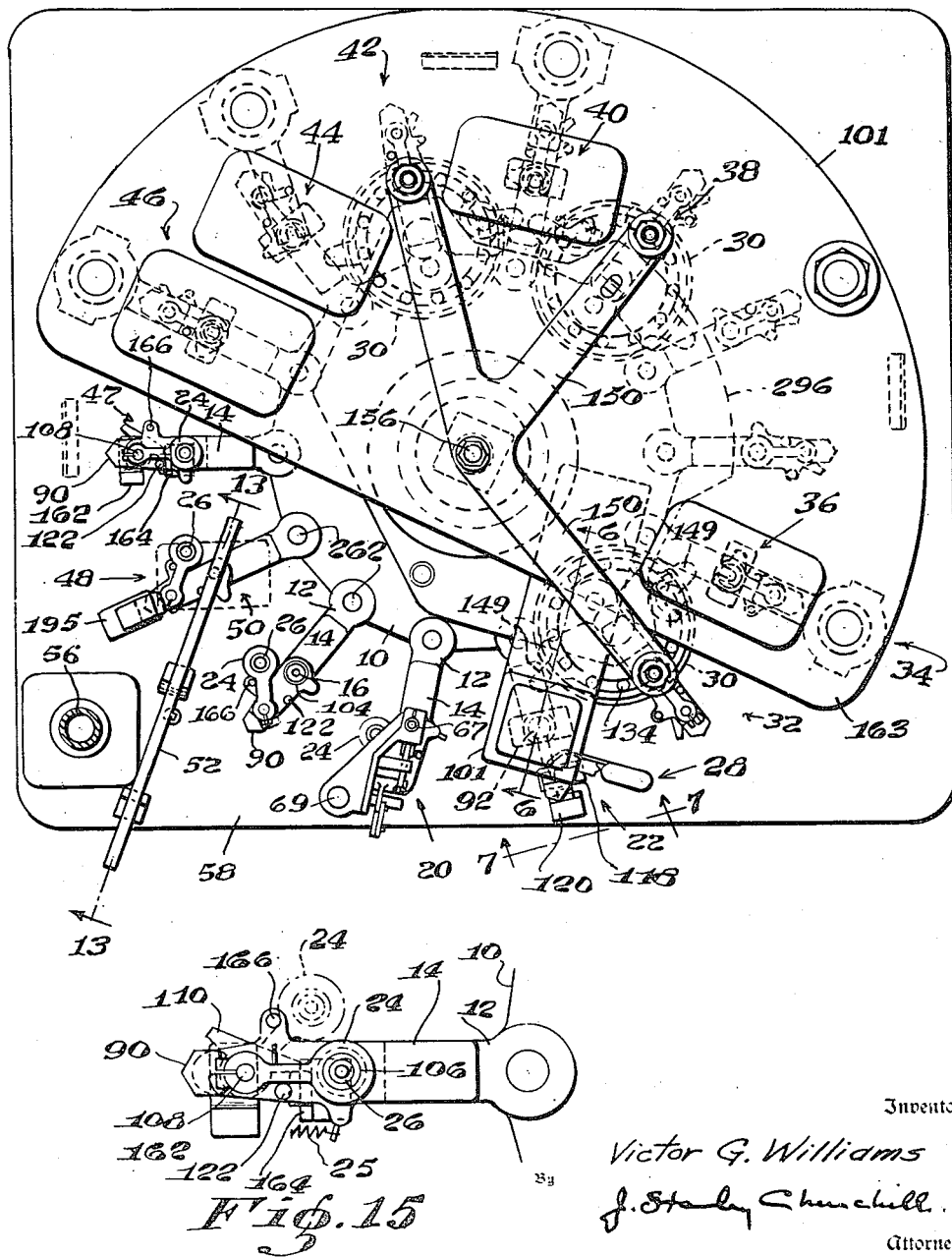
Fig. 1 is a plan view of the present container filling machine.
Fig. 15 is a plan view detail of a carrier.

In general, the present invention contemplates a novel and improved container filling machine of the type illustrated and described in the Williams patent, No. 2,331,587 wherein successive charges, preferably of different kinds of powder, are deposited into successive projectile casings and the powder compressed within the casings. In accordance with the present invention, provision is made for effecting application of pressure to compress the powder in the casing after each individual charge of powder and for also effecting a final compressing operation. The present machine is preferably of a rotary structure and embodies novel features enabling the machine to fill the casings and compress the powder therein in a more rapid and efficient manner than the machines heretofore in use.

Referring now to the drawings, the present container filling machine comprises an intermittently operated rotary spider 10 having a plurality of radially extended arms 12, each of which is provided with a holder or carrier 14 having an opening 16 therein arranged to snugly receive and carry a projectile casing 18 to be filled. The casings are arranged to be introduced into successive carriers 14 by any suitable feeding mechanism, such as the feeding mechanism shown in Fig. 3, successive casings 18 being released in timed relation to the operation of the intermittently operated spider by releasing mechanism indicated in Fig. 4 as will be described.

In general, in the operation of the container filling machine, the rotary spider 10 is arranged to be intermittently moved to present successive holders or carriers 14 to successive operating stations and as herein shown, see Fig. 1, the casing is received in the carrier at the station indicated at 20. The casing is loosely deposited in the holder at station 20, and at station 22 provision is made for pressing the casing down into the opening to present the upper or open end of the casing flush with the upper surface of the carrier. The carrier 14 is provided with an arm 24 pivotally mounted thereon which is provided with a guide or funnel opening 26 at its outer end. The arm 24 is initially disposed out of alignment with the opening 16 in the carrier, and upon leaving station 22 the arm is arranged to be rocked to present the guide opening into alignment with the carrier opening 16. The carrier unit then passes a safety device, indicated at 28, to assure the proper disposition of the parts prior to passing under the first powder charging hopper 30 to receive a load of powder at station 32. At the next station of operation, as indicated at 34, the partial charge of powder deposited in the casing is compressed by fluid operated means, indicated generally at 36. Successive powder charges are deposited, and such charges are compressed at subsequent alternate stations 38, 40, 42, 44 respectively, a final compressing operation being performed at station 46. At station 47 the arm 24 is rocked to dispose the guide opening 26 out of alignment with the opening 16, and the filled and compressed casing is then ejected upwardly out of the carrier opening 16 at station 48 by mechanism indicated generally at 50 to be received in a guide chute 52 arranged to guide the filled casing out of the machine into a suitable receptacle.

Referring now particularly to Figs. 3 and 5, the cartridge casing supply mechanism illustrated therein may comprise a supply hopper unit 54 containing a supply of the casings. The supply hopper unit is mounted on an upright 56 attached to the platen 58 of the machine frame. An inclined circular disk 60 is rotatably mounted on a shaft 61 supported in the hopper 54 and is provided with a plurality of radial slots 62 adjacent its periphery arranged to receive the casings deposited in the hopper. A stationary disk 59 is fast on the shaft 61, and the rotatably mounted disk 60 is driven by a motor 55 and gear-reduction unit indicated at 63 through a chain and sprocket drive 65. In operation, the casings 18 withdrawn from the supply by dropping into the radial slots 62 are carried around by the disk 60 to the upper end of the hopper into alignment with an inclined conduit or chute 64 and into which the casings 18 are discharged by gravity. The chute 64 has provision, as indicated at 66, for trapping and ejecting back into the supply hopper those casings which are directed open end first, the casings directed head first passing beyond the ejector 66 and forming a line in an extended portion 67 connected to the chute 64 wherein successive foremost casings are arranged to be released by the mechanism illustrated in Fig. 4. As herein shown, the releasing mechanism is mounted on a standard 69 attached to the platen 58 and comprises a pair of oppositely reciprocated stop members mounted on rods 68, 70 spaced one above the other and which are spring-pressed into the path of the casings in the conduit extension 67. The stop members are arranged to be reciprocated in opposed directions by a two-armed lever pivotally mounted at 72, one arm 74 being arranged to engage a nut adjustably carried by the upper stop rod 68, the other arm 78 being arranged to engage a similar nut carried by the lower stop rod 70.

The two-armed lever 74, 78 is arranged to be rocked to release successive foremost casings into the opening 16 of successive carriers 14 each time the spider 10 is intermittently moved one station of operation. As herein shown, the two-armed lever is rocked by linkage including arms 82, 84 and connecting link 86, the arm 84 having a cam roll 88 arranged to cooperate with a cam piece 90 mounted on the outer end of each radially extended carrier arm 14. It will be observed that the discharge end 71 of the conduit extension 67 preferably comprises a coil spring adapted to yield in the event that the upper end of the casing is not disposed a sufficient distance below the discharge end so as to prevent jamming of the casing or damage to the conduit when the carrier starts its intermittent movement during the next cycle of operation.

The pressing mechanism at station 22, shown in detail in Fig. 6, may comprise a spring-pressed stud 92 having a head 94 at its lower end. The stud 92 is slidingly mounted in a sleeve 96 carried on the end of a rod 97 operated by a fluid press 98. A spring 99, interposed between the head 94 and the lower end of the sleeve 96 is arranged to urge the stud downwardly. The sleeve 96 is provided with a pin 100 extended through a slot 102 in the stud 92 to limit the sliding movement of the stud in the sleeve. In operation, the presser head 94 is arranged to descend and yieldingly engage the upper end of the casing 18 to press it downwardly into the opening 16 in the carrier until the upper end of the casing is flush with the upper surface of the carrier 14. As herein shown, the fluid press 98 may be supported in a bracket 101 extended from and attached to the underside of an upper platen 163.

As illustrated in Fig. 14, the opening 16 is formed in a bushing 104 fast in the carrier 14 and is provided with a reduced-diameter upper end forming a shouldered portion 105 arranged to fit into a counterbored portion 107 formed at the lower end of a bushing 106 carried by the pivoted arm 24. In operation, the arm 24 is rocked to dispose the counterbored portion 107 out of alignment with the opening 16 in the carrier prior to the casing receiving and pressing operations, and after the casing has been pressed down into the opening 16 as described, provision is made for rocking the arm 24 to dispose the same in alignment with the casing. The bushing 106 provided with the funnel opening 26 is arranged to guide a charge of powder received from the hopper 30 into the casing 18, as will be described.

Figure 2:
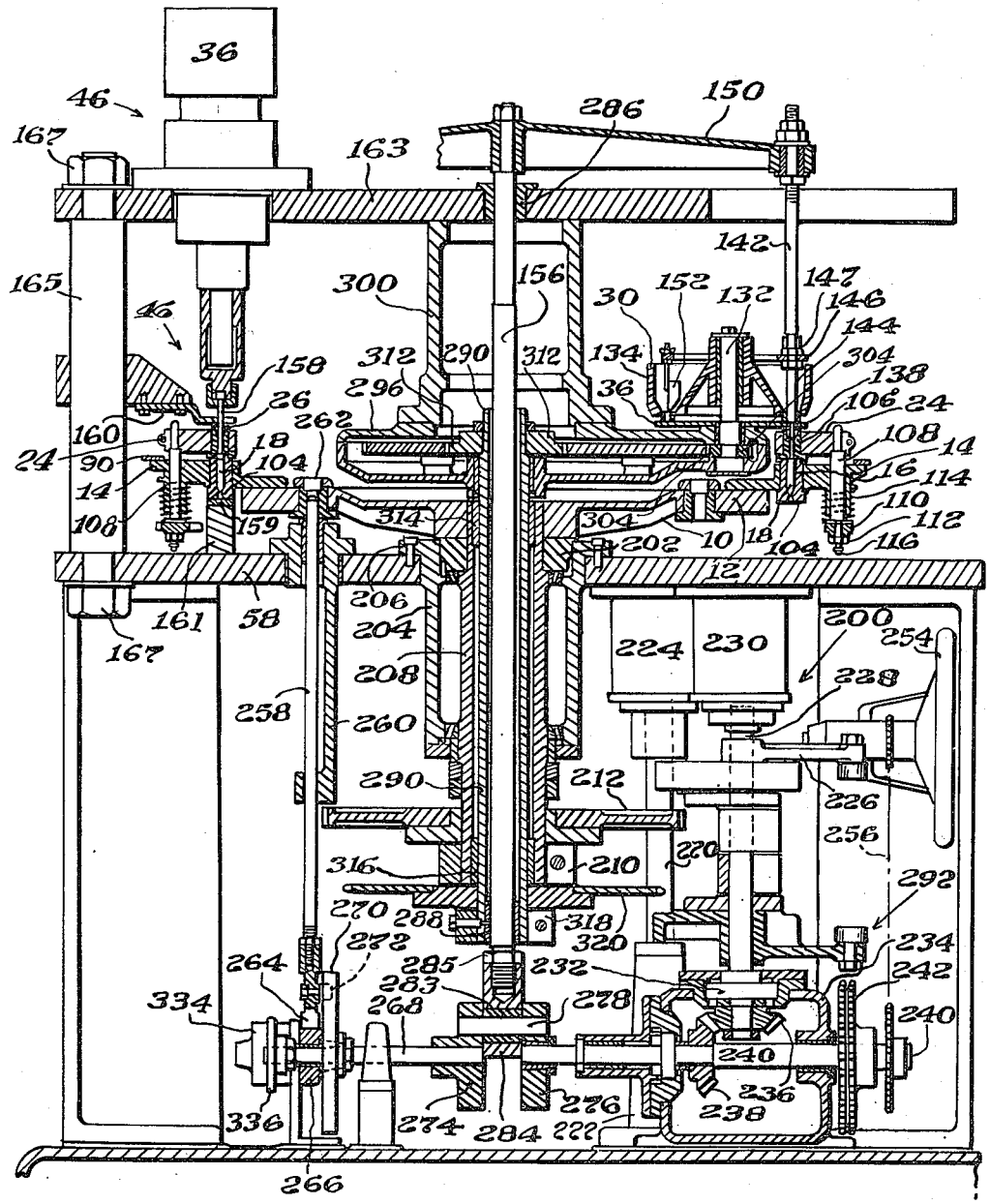
Fig. 2 is a vertical cross-sectional view of the machine.

As illustrated in Figs. 2 and 14, the arm 24 is mounted fast on the upper reduced-diameter end of a pin 108 rockingly mounted and vertically slidable in a sleeve bushing 109 provided in the outer end of the carrier 14. The lower end of the pin 108 is provided with a two-armed rocker member 110 adjustably secured thereto by a nut 112, and a spring 114 coiled about the pin 108 is interposed between a collared portion of the underside of the carrier and the rocker member 110. The spring 114 is arranged to urge the pin 108 and the arm 24 carried thereby downwardly, and the lower end of the pin 108 is provided with a round head projection 116 arranged to engage a stationary cam piece 118 fixed to the platen 58 to effect lifting of the arm 24, see Fig. 7. A second stationary cam or friction member 120 fixed to the platen 58 is arranged to cooperate with the outwardly extended arm of the rocker member 110 to effect rocking of the arm in a clockwise direction, viewing Fig. 1, into alignment with the opening 16 in the carrier 14.

This position is determined by a stop pin 122 projecting upwardly from the carrier 14 to limit the swinging movement of the arm 24 in this direction. In operation, the arm 24 is lifted and rocked into its aligned position during the initial movement of the carrier from station 22, and as the projection 116 continues to ride over the inclined cam piece 118, the arm 14 will descend by virtue of the spring 114 to bring the counterbored portion 107 of the funnel guide bushing 106 into engagement with the reduced-diameter portion 105 of the bushing 104 which locks the parts in their aligned position and prevents rocking of the arm 14 until the arm is subsequently elevated to clear the reduced-diameter portion 105.

Provision is made at this time for assuring the proper disposition of the parts prior to passing under the hopper 30 to receive a charge of material. This is accomplished by a safety arm 124 arranged in the path of the upper rounded end of the pin 108. If the parts are in their lowered position with the casing 18 fully seated in the opening 16 and the counterbored portion 107 fitted over the shouldered portion 105, the top of the pin 108 will pass under the safety arm 124 indicating that the parts are in proper filling position. However, if the casing is not fully seated or the arm 24 is not lowered into filling engagement with the opening 16, the top of the pin 108 will engage the arm 124 to operate a microswitch 126 which is supported in a bracket 128 attached to the platen 58. The microswitch 126 forms part of a circuit which includes an electromagnet 130, see Fig. 11, which is arranged to be energized to release the clutch mechanism and effect stopping of the machine, as will be hereinafter described.

At the following station, indicated generally at 32, provision is made for depositing a charge of the powder into the casing 18 supported in the carrier 14. The hopper 30 is secured to an intermittently driven shaft 132 arranged to be rotated by gearing to be hereinafter described, and the bottom of the hopper is provided with a plurality of measuring chambers or flasks 134 which may be removably secured therein. In operation, the powder drops into the chambers, and a stationary disk 136 prevents the powder from spilling out of the chambers until they reach a discharge opening 138 in the disk 136. To prevent the powder in each hopper above the measuring chambers from passing through the chambers as they are brought into register with the discharge opening 138 and to insure all the contents of the measuring chamber in register with the discharge opening being discharged therethrough, a scraper 140 is provided at the lower end of a tubular support 144 which is held from rotation in the hopper with the scraper disposed immediately above the upper surface of the bottom of the hopper. In order to urge the material from the measuring chamber through the discharge opening and into the funnel guide 26 a reciprocal plunger 142 is provided arranged to extend through the support 144 and scraper 140. The scraper 140 for the hopper 30 may be formed of a flat piece of metal which is arcuate in plan to lie in the annular space at the bottom of the hopper. The tubular support 144 is adjustably secured to a stationary ring 146 by lock nuts 147, and the ring is provided with lugs 149 which may be secured by suitable spacing collars and bolts to the machine frame. The plunger 142 is guided in the tubular support 144, and the upper end of the plunger 142 is connected with a cross head 150 secured to the upper end of a central shaft 156 arranged to be reciprocated to effect operation of the plunger at the proper time in the operation of the machine. A stirrer blade 152 secured to the stationary ring 146 is arranged to extend into the hopper to maintain the powder in a loose and flowable condition.

After receiving its charge of powder the carrier 14 is intermittently moved to the next succeeding station, indicated at 34, where the charge of powder is compressed in the casing 18. As illustrated in Fig. 2, the compressing operation is accomplished by a plunger rod 158 connected to the hydraulically operated press 36. The lower end of the plunger rod is guided in a bracket 160 connected to the machine frame, and in operation, when the carrier 14 comes to rest at the pressure-applying station 34, the plunger is operated to extend through the funnel member 26 and into the casing 18 to compress the material therein. The hydraulically operated press at station 46 is typical of the pressure-applying stations 34, 40, 44, and as herein shown, the carrier comes to rest at such stations with the lower end of the bushing 104 in engagement with a stationary backing plate 159 mounted on top of a bracket 161 attached to the platen 58 in order to resist the pressure and to effect high compression of the powder. It will also be observed that the bracket 160 is in engagement with the upper end of the arm 24 and serves to prevent lifting of the arm with the plunger 158 during the upward or retracting stroke thereof.

Thereafter the carrier 14 is intermittently moved through stations 38, 40 to receive a second charge of powder at station 38 and to be subsequently compressed at station 40, stations 38, 40 being similar in structure and mode of operation to stations 32, 34. A third charge of powder is deposited into the casing 18 at station 42 which is thereafter compressed at station 44, a final compressing operation being performed at station 46. The hydraulic presses 36 are mounted on the upper platen 163 which is supported from the lower platen 58 by spacing studs 165 threaded at their reduced-diameter ends which extend through the platens and are secured thereto by nuts 167. As herein shown, provision is made for rocking the arm 24 out of alignment with the carrier opening 16 prior to arriving at the ejecting station 48. The mechanism for rocking the arm 24 is similar to that previously described wherein projection 116 of the pin 108 engages a stationary cam 162 to effect elevation of the arm 24 whereupon the second and inwardly extended arm of the rocker member 110 frictionally engages a second cam piece 164 to effect rocking of the arm in a counterclockwise direction upon movement of the carrier from station 47 to station 48. A stop pin 166 extending upwardly from the carrier is arranged to limit the rocking movement of the arm 24 in this direction, and a spring 25 may be connected to hold the arm 24 against the stop pin 166.

Referring now to Figs. 1 and 13, the ejecting mechanism 50 comprises a hydraulically operated plunger 167' having a relatively thin rod 168 at its upper end and which is arranged to be urged upwardly through a small tapered opening 170 in the lower end of the bushing 104 into engagement with the head of the casing 18. The filled and compressed casing is ejected through an opening in the bottom wall of a relatively narrow guide member or chute 52 having a curved portion 174 arranged to urge the upper end of the casing to the right so as to align the casing in the chute with the head directed to the left viewing Fig. 13. Provision is made for rocking the guide member 52 to discharge the casing therefrom, and as herein shown, the guide 52 is provided with a depending portion 175 pivotally supported at 176 in a bracket 178 attached to the platen 58. The guide member is urged downwardly in a clockwise direction by a coil spring 180 to dispose the same in a horizontal position in communication with the carrier 14 and is arranged to be rocked in a counterclockwise direction by a slotted link 182 connected at its lower end to a bracket 184 carried by and extended from the hydraulic plunger 167'. In operation, when the plunger is directed upwardly to eject the casing into the guide member 52, the latter is retained in a horizontal position in engagement with the upper end of the bushing 104 by engagement of the lower end of the slot with a pin 188 carried by the portion 175, and during the descending movement of the plunger, the upper end of the slot engages the pin 188 to effect rocking of the guide in a counterclockwise direction to cause the casing to slide out of the discharge end of the chute into a suitable receptacle provided therefor. As illustrated in Fig. 13, the discharge end of the chute 52 may be supported between the upstanding legs of a bracket 192 attached to the platen 58 to prevent lateral displacement of the chute. It will also be observed that a stationary bracket 195 overlies a portion of the outer end of the arm 14 at the ejecting station to prevent upward displacement of the arm during the ejecting operation. As shown in Fig. 13, the hydraulic operating unit 169 may be supported in a bracket 190 attached by suitable bolts 194 and spacing collars 196 to the underside of the platen 58.

As illustrated in Figs. 2 and 10, the spider 10 is arranged to be intermittently driven through a distance of one station each cycle of operation by Geneva mechanism indicated generally at 200. As herein shown, the spider 10 is secured to an annular member 202 rotatably mounted in a bearing formed in a cylindrical bracket 204 having a flanged portion 206 secured to the lower platen 58. The annular member 202 is fast on an outer hollow shaft or sleeve 208 rotatably supported in the bracket 204 and which is provided at its lower end with a collar 210 and gear 212 fast thereon. The gear 212 is arranged to mesh with a pinion 214, see Figs. 9 and 10, which is secured to the driven member 216 of the upper Geneva mechanism 200 by an intermediate disk 219 and bolts 217, 218. The driven member 216 of the Geneva drive is rotatably mounted on an idler shaft 220 supported at its lower end in a bracket 222 attached to the base of the machine and at its upper end in a bracket 224 attached to the underside of the platen 58.

Figure 9:
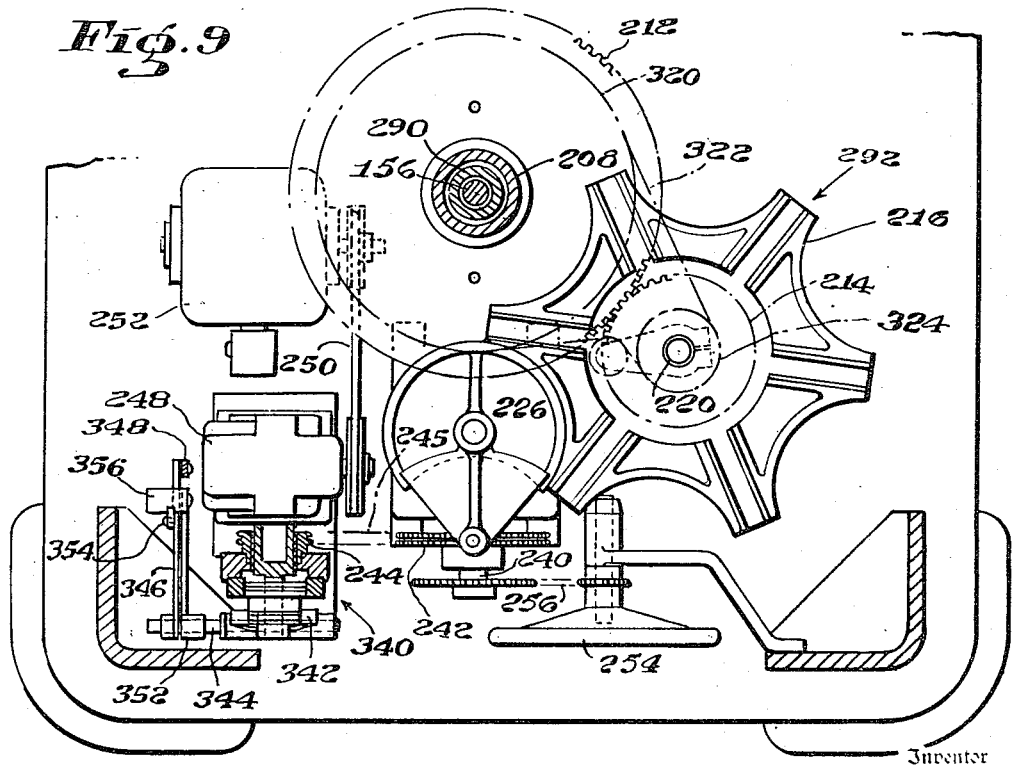
Fig. 9 is a plan view of Geneva driving mechanism.

The driving member 226 of the Geneva drive is fast on a vertical shaft 228 rotatably mounted at its upper end in a bracket 230 attached to the underside of the platen 58, the lower end being supported in a bearing 232 carried in the upper end of a gear housing 234 attached to the base of the machine. The vertical shaft 228 is arranged to be continuously rotated through bevel gears 236, 238, the latter being fast on the main drive shaft 240 rotatably supported in the housing 234 and provided with a sprocket 242 connected by a chain 245 to a clutch sprocket 244 arranged to be operatively connected to the output shaft 246 of a gear-reduction unit 248. The input shaft of the unit 248 is connected by a belt and pulley drive 250 to an electric motor 252, as shown in Fig. 9. A handwheel 254 is connected by a sprocket and chain drive 256 to the main drive shaft 240, as shown in Fig. 2.

Provision is made for accurately positioning and releasably locking the spider 10 at each station of operation, and as herein shown, a vertically reciprocal rod 258 mounted in a bracket 260 attached to the platen 58 is arranged to engage one of a plurality of bushed openings 262 carried in the spider 10 and located in radial alignment with the carriers 14. The lower end of the rod 258 is connected to a forked member 264 arranged to embrace a collar 266 mounted on an extension 268 of the main driving shaft 240. The rod 258 is arranged to be reciprocated in timed relation to the intermittent movement of the spider 10 by a cam 270 fast on the extension 268 and a cooperating roll 272 carried by the forked member 264.

The extension 268 is connected to the shaft 240 by coupling flanges 274, 276 connected to the adjacent ends of the shafts and by a crank pin 278 extended through the flanges and through a block 283 interposed between the flanges. The block 283 is embraced in a horizontal slot formed in a cross-head link 284, and the link 284 is threadedly connected to the lower end of the central shaft 156 and is secured thereto by a nut 285. Thus, in operation, the central shaft 156 carrying the cross bar 150 is reciprocated once each cycle in timed relation to the operation of the spider 10 to effect operation of the plungers 142 to eject the material from the measuring chambers into the casings 18 in register therewith. The central shaft 156 may be supported for reciprocation in an upper bushing 286 carried by the upper platen 163 and in a lower bushing 288 provided in an inner hollow shaft or sleeve 290.

Figure 8:
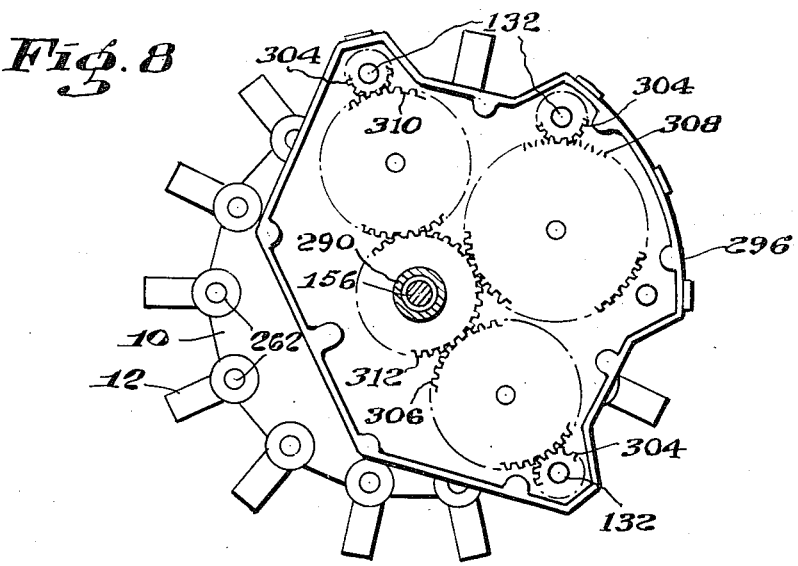
Fig. 8 is a plan view of the powder hopper drives.

As herein illustrated, each powder hopper 30 mounted for rotation with driven shafts 132 is arranged to be intermittently rotated through a distance of one charge-forming chamber each cycle of operation by the lower Geneva drive mechanism indicated generally at 292. The shafts 132 are rotatably supported in bearings 294 formed in a split housing 296, the upper half of the housing being secured to the lower end of a cylindrical bracket 300 which is attached to the underside of the upper platen 163. Each shaft 132 is provided with a pinion 304 arranged to mesh with idler gears 306, 308, 310 respectively carried by the housing 296, see Fig. 8, which in turn mesh with a driving gear 312 fixed to the upper end of the inner sleeve 290.

The sleeve 290 is rotatably mounted in bushings 314, 316 provided in the outer sleeve 208, and the lower end of the sleeve 290 is provided with a collar 318 and with a sprocket 320 fast thereon. The sprocket 320 is connected by a chain 322 to a sprocket 324 attached to and rotatable with the driven member 326 of the lower Geneva drive 292. The driven member 326 is rotatably mounted on the stationary shaft 220 and is intermittently rotated by the driving member 328 fast on the vertical shaft 228 which is continuously rotated through the driving mechanism hereinbefore described. A chain tightener sprocket 330 is carried by an arm 332 fast on the idler shaft 220, as illustrated. Thus, in operation, the hoppers 30 are rotated through a distance of one measuring chamber each cycle in timed relation to the intermittent movement of the carriers 14.

As illustrated in Figs. 2 and 12, one or more valves 334 may be provided to control the operation of the presses for compressing the material at stations 34, 40, 44, 46 and for operating the casing press 98 and the ejector unit 169. Such valves may be actuated by a cam 336 fast on the shaft extension 268, and a roller 338 carried by the plunger of the valve 334.

As shown in Figs. 9, 10 and 11, the clutch mechanism for the present machine may comprise a conventional clutch unit 340 having a forked arm 342 connected to the driving element of the clutch and arranged to engage the same with the driven element comprising the pulley 244. The clutch arm 342 is fast on a rocker shaft 344 which is provided with a lever 346 connected by a link 348 to a clutch operating handle 350. The lever 346 may be loose on the rocker shaft 344, and the latter is provided with a second lever 352 fast thereon and operatively connected to the lever 346 by a releasable latch mechanism including a spring-held latch member 354 pivotally carried by the lever 346 and which is engaged with an upstanding and laterally extended portion 356 of the lever 352. The underside of the lever 346 is provided with a corresponding laterally extending portion 358, and a bolt 360 fast in the portion 358 is extended through the portion 356. A spring 362 interposed between the portions 356, 358 is arranged to urge the arm 352 upwardly, the parts being retained in their locked position by the latch 354. A link 364 connects the latch 354 with the armature 366 of the electromagnet 130. In operation, when the clutch is manually operated by the handle 350, the levers 346, 352 will move together to effect engagement and disengagement of the clutch. However, when the electromagnet 130 is energized by closing of the microswitch 126, indicating that the parts of the carrier 14 are not in proper position to pass under the powder hopper 30, the latch 354 will be rocked to release the lever 352, the spring 362 operating to rock the lever 352 upwardly relative to the lever 346 to effect disengagement of the clutch.

From the above description, it will be seen that the present filling machine is capable of depositing successive charges of powder in each cartridge casing and compressing successive charges therein in a rapid and efficient manner.

While the preferred embodiment of the invention has been herein illustrated and described, it will be understood that the invention may be embodied in other forms within the scope of the following claims.

Having thus described the invention, what is claimed is:

1. In a container filling machine of the type having an intermittently rotated spider having a plurality of carriers secured thereto and movable therewith for supporting open-mouthed containers having cylindrical body portions and conically shaped at their lower ends, and means for alternately depositing and compressing a plurality of successive partial charges of material into successive containers, the improvement comprising each of said carriers having a holder provided with an opening cylindrical at its open upper end and conically shaped at its lower end forming a socket conforming to the shape of the container for snugly receiving and embracing the entire container with the open end thereof flush with the upper surface of the holder whereby to prevent expansion of the walls of the container during the compressing operations, said holder having a tapered ejection opening at its lower end communicating with said socket opening, said carrier having a pivotally mounted arm provided with a funnel shaped opening arranged to be rocked into alignment with the holder opening and resiliently urged into snug engagement therewith prior to the filling operation, driving means including a clutch, detecting means including an electrical circuit having a switch arranged to be engaged by said arm in the event that the arm is prevented from snug engagement with the holder opening by a non-flush container, and a solenoid in said circuit actuated by said switch and operatively connected to said clutch for disengaging the same when a non-flush condition is detected.

2. In a container filling machine of the type having an intermittently rotated spider having a plurality of carriers secured thereto and movable therewith for supporting open-mouthed containers having cylindrical body portions and conically shaped at their lower ends, and means for alternately depositing and compressing a plurality of successive partial charges of material into successive containers, the improvement comprising each of said carriers having a holder provided with an opening cylindrical at its open upper end and conically shaped at its lower end forming a socket conforming to the shape of the container for snugly receiving and embracing the entire container with the open end thereof flush with the upper surface of the holder whereby to prevent expansion of the walls of the container during the compressing operations, said holder having a tapered ejection opening at its lower end communicating with said socket opening, means for ejecting the filled containers upwardly through the open end of said sockets including a vertically reciprocable rod extended through said tapered ejection opening, and means for guiding and discharging the ejected container from the machine comprising a relatively narrow pivotally mounted chute having an opening in its lower wall for receiving the ejected container, the upper wall of the chute having a curved portion for guiding the container to present the conical end in the direction of discharge, and means for rocking the chute to effect discharge of the container from the chute.

References Cited in the file of this patent

UNITED STATES PATENTS

| | | |
|---|---|---|
| 668,906 | De Braam | Feb. 26, 1901 |
| 1,282,609 | Macomber | Oct. 22, 1918 |
| 1,943,013 | Gangler | Jan. 9, 1934 |
| 2,150,913 | Drew | Mar. 21, 1939 |
| 2,331,587 | Williams | Oct. 12, 1943 |
| 2,345,552 | Ballou | Apr. 4, 1944 |
| 2,356,281 | Snodgrass | Aug. 22, 1944 |
| 2,388,250 | Campbell | Nov. 6, 1945 |